(12) United States Patent
Wilcox et al.

(10) Patent No.: US 10,609,179 B2
(45) Date of Patent: Mar. 31, 2020

(54) METHOD AND SYSTEM ESTABLISHING A NETWORK CONNECTION

(71) Applicant: KABUSHIKI KAISHA TOSHIBA, Tokyo (JP)

(72) Inventors: James Wilcox, Bristol (GB); Dritan Kaleshi, Bristol (GB); Mahesh Sooriyabandara, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 288 days.

(21) Appl. No.: 15/022,770

(22) PCT Filed: Sep. 18, 2013

(86) PCT No.: PCT/GB2013/052438
§ 371 (c)(1),
(2) Date: Mar. 17, 2016

(87) PCT Pub. No.: WO2015/040350
PCT Pub. Date: Mar. 26, 2015

(65) Prior Publication Data
US 2016/0234337 A1 Aug. 11, 2016

(51) Int. Cl.
*H04L 29/08* (2006.01)
*H04N 1/327* (2006.01)
*H04L 29/06* (2006.01)

(52) U.S. Cl.
CPC ...... *H04L 67/322* (2013.01); *H04L 29/06537* (2013.01); *H04L 69/24* (2013.01);
(Continued)

(58) Field of Classification Search
CPC ..... H04L 67/322; H04L 69/326; H04L 67/34; H04L 69/24; H04L 29/06537;
(Continued)

(56) References Cited

U.S. PATENT DOCUMENTS

2007/0180450 A1* 8/2007 Croft .................... G06F 3/1415
718/1
2007/0217406 A1* 9/2007 Riedel .................... H04L 47/14
370/389

(Continued)

FOREIGN PATENT DOCUMENTS

WO    WO 01/76170 A2   10/2001

OTHER PUBLICATIONS

Ravindran et al, "Architecture for Dynamic Protocol-level Adaptation to Enhance Network Service Performance", IEEE 2006.*

(Continued)

*Primary Examiner* — Le H Luu
(74) *Attorney, Agent, or Firm* — Finnegan, Henderson, Farabow, Garrett & Dunner, L.L.P.

(57) ABSTRACT

A method of establishing a network connection between an application hosted on a first network device and a second network device, comprising receiving data from the application indicating communication requirements for the network connection, identifying a plurality of alternative available transport level components; and based on the received data, selecting one of the transport level components for use in the network connection.

24 Claims, 11 Drawing Sheets

(52) U.S. Cl.
CPC ............ *H04L 69/326* (2013.01); *H04N 1/327* (2013.01); *H04N 1/32765* (2013.01)

(58) Field of Classification Search
CPC ............ H04L 29/06027; H04L 12/6418; H04L 12/66; H04L 41/0803; H04L 43/10; H04L 47/10; H04N 1/327; H04N 1/32765; G06Q 20/10; G06F 3/1415
See application file for complete search history.

(56) References Cited

U.S. PATENT DOCUMENTS

| | | | | |
|---|---|---|---|---|
| 2007/0276948 | A1* | 11/2007 | Burdett | H04L 67/34 709/228 |
| 2009/0003334 | A1* | 1/2009 | Vadlakonda | H04L 43/10 370/389 |
| 2009/0046842 | A1* | 2/2009 | Allen | H04L 29/06027 379/201.01 |
| 2009/0185581 | A1* | 7/2009 | Beverly | H04L 69/24 370/474 |
| 2010/0005143 | A1* | 1/2010 | Weens | H04L 41/0803 709/204 |
| 2010/0205099 | A1* | 8/2010 | Ahmavaara | G06Q 20/10 705/80 |
| 2010/0272030 | A1* | 10/2010 | Babbar | H04L 47/10 370/329 |
| 2012/0110115 | A1* | 5/2012 | Lin | H04L 12/66 709/217 |
| 2013/0114482 | A1* | 5/2013 | Oh | H04L 12/6418 370/310 |

OTHER PUBLICATIONS

Nakajima, "Dynamic Transport Protocol Selection in a CORBA System," 3$^{rd}$ IEEE International Symposium on Object-Oriented Real-Time Distributed Computing (ISORC 2000) (2000). pp. 1-10.

Zhang et al., "QoS-aware Self-adaptation of Communicaton Protocols in a Pervasive Service Middleware," 2010 IEEE/ACM International Conference on Cyber, Physical and Social Computing (2010), pp. 1-10.

* cited by examiner

|  | Brokered TCP | Brokerless TCP | Brokerless Multicast |
|---|---|---|---|
| Packets | 5302539 | 2598393 | 1351479 |
| Avg. Mbit/s | 19.85 | 15.42 | 2.93 |

METHOD AND SYSTEM ESTABLISHING A NETWORK CONNECTION

FIELD

Embodiments described herein relate to methods and systems for establishing a network connection between entities in a communications network.

BACKGROUND

Quality of Service (QoS) is an important consideration for implementing networked applications. The QoS for any given application will depend on the type of transport protocol that is employed for that application. In conventional distributed systems, considering a layered architecture, optimisation of QoS is initiated and often carried out at the application layer, with the result that all ensuing communications are transported using the same transport layer protocol (which in the Internet may be the Transport Control Protocol TCP, for example). However, mechanisms for optimising QoS can negatively impact application and network performance when the network environment changes over time, or where the system includes multiple applications having differing networking requirements.

It follows that it is desirable to provide new mechanisms for optimising QoS when establishing network connections between devices in a machine-to-machine distributed system.

BRIEF DESCRIPTION OF FIGURES

Embodiments of the invention will now be described by way of example with reference to the accompanying drawings in which.

DETAILED DESCRIPTION

Figure 1:
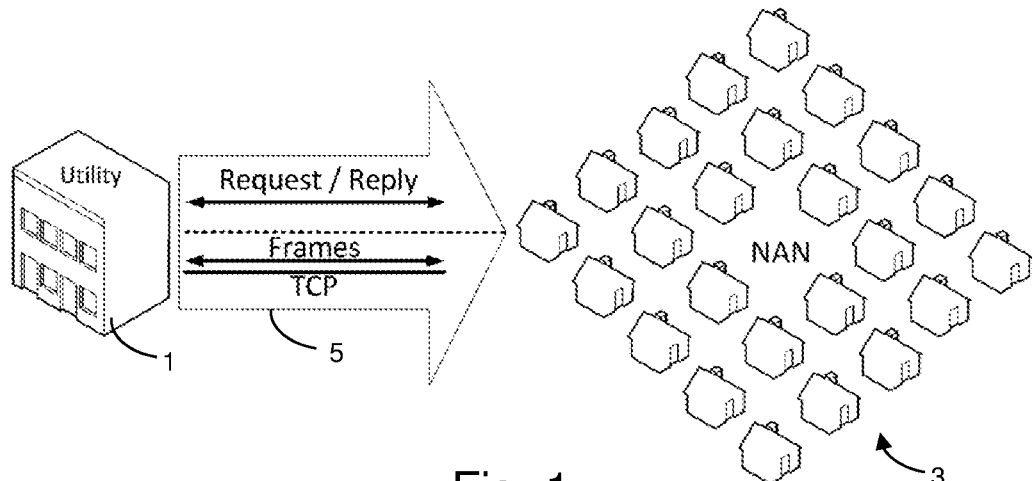
FIG. 1 shows an example of a conventional system in which a utility provider communicates with buildings in a near-me area network (NAN)

According to a first embodiment, there is provided a method of establishing a network connection between an application hosted on a first network device and a second network device, comprising:
  receiving data from the application indicating communication requirements for the network connection;
  identifying a plurality of alternative available transport level components; and
  based on the received data, selecting one of the transport level components for use in the network connection.

The plurality of transport level components may include one or more transport protocols. The plurality of transport level components may include one or more messaging patterns.

The transport level component may be chosen so as to optimise the quality of service (QoS) of the network connection.

The communication requirements may relate to one or more of the latency and bandwidth required for the network connection.

In some embodiments, the choice of the transport level component may be varied during the course of a single session between the application and the second network device. A first one of the available transport level components may be selected during initiation of the session and an alternative one of the available transport level components may be subsequently selected during that same session.

In some embodiments, the method may include receiving information about the network environment. The choice of transport level component may be determined at least in part based on the information. The selection of transport level components may be varied overtime in response to changes in the network environment.

The first network device may host a plurality of applications. In some embodiments, the method may comprise establishing a respective network connection for each application, the selection of transport components being carried out independently for each application.

In some embodiments, the method may comprise generating a respective network socket for each application, the socket being generated based on the transport components selected for that application's network connection.

In some embodiments, the method may comprise transmitting data from the application to the second network device across the network connection.

According to a second embodiment, there is provided a device for establishing a network socket for connecting an application to a communications network, the device comprising:
  a middleware component configured to interface with the application and to receive data from the application indicating communication requirements of the application;
  the middleware being operable to identify a plurality of alternative available transport level components for use in communicating data from the application over the network and to select one of the transport level components for generating the network socket.

The plurality of transport level components may include one or more transport protocols. The plurality of transport level components may include one or more messaging patterns.

The transport level component may be chosen so as to optimise the quality of service QoS of the network connection.

The communication requirements may relate to one or more of the latency and bandwidth required for the network connection.

In some embodiments, the middleware component is configured to vary the choice of the transport level component during the course of a single session between the application and the second network device. The middleware component may be configured to select a first one of the available transport level components during initiation of the session and to subsequently select an alternative one of the available transport level components during that same session.

The middleware may be configured to receive as input information about the network environment and to select the transport level component at least in part based on the information. The middleware may be configured to interface with a plurality of applications and to receive data from each application indicating communication requirements of the respective application. The middleware may be operable to select a transport level component for generating a respective network socket for each application, wherein the transport level components are selected independently for each application.

In some embodiments, each application is hosted on the device.

According to a third embodiment, there is provided a system comprising a plurality of devices according to the second embodiment.

According to a fourth embodiment, there is provided a system comprising a network device that hosts one or more applications and one or more devices according to the second embodiment.

According to a fifth embodiment, there is provided a computer readable storage medium comprising computer executable instructions that when executed by the computer will cause the compute to carry out a method according to the first embodiment.

FIG. 1 shows an example of a conventional system, in which a utility provider 1 communicates with buildings in a near-me area network (NAN) 3. Data is sent between the utility 1 and the other entities in the NAN 3 via a network connection 5. All data that is sent is transmitted using the same combination of components in the transport layer. In the example shown in FIG. 1, this combination comprises a single TCP transport protocol and messaging pattern. The ability to prioritise performance on a per-application basis is not available, i.e. there is no option for the application to dynamically adapt to changing network conditions or QoS priority changes through modifying the transport protocol or messaging pattern.

Figure 2:
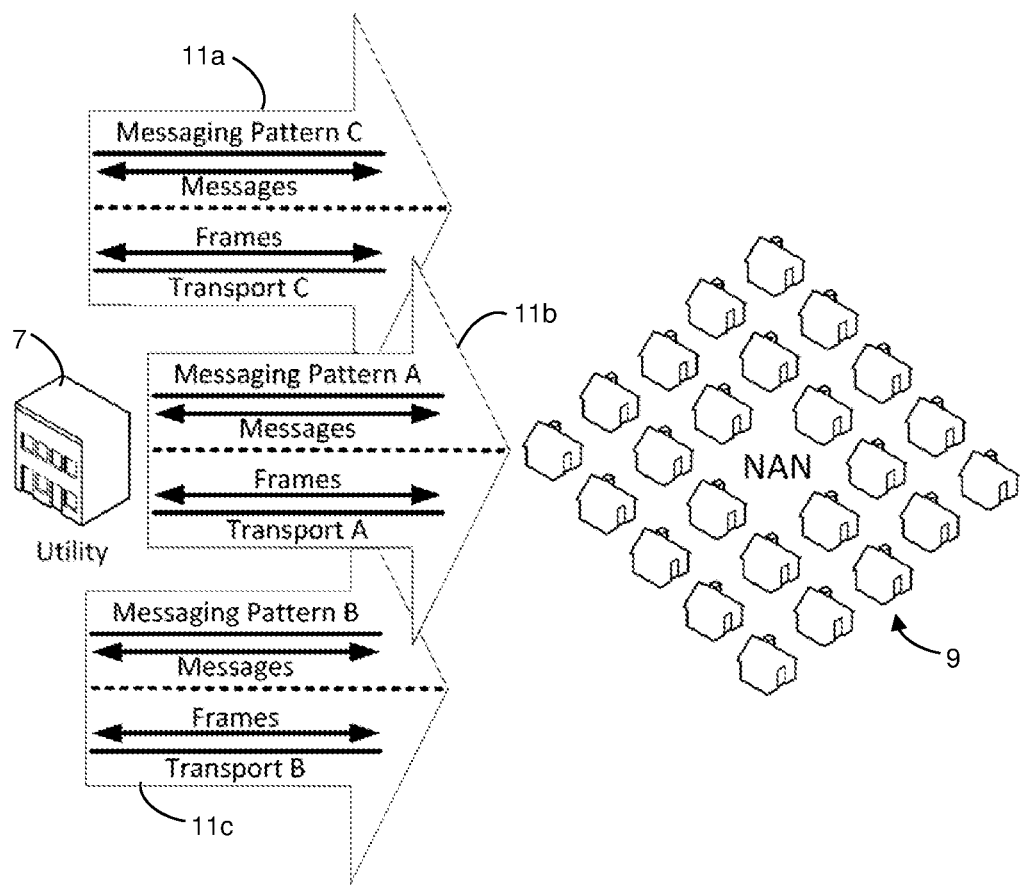
FIG. 2 shows an example of a system according to an embodiment.

In contrast to the situation shown in FIG. 1, embodiments described herein provide a mechanism, whereby communications can be optimised on a per-application and per-connection basis through the manipulation and selection of the application's transport level components. FIG. 2 shows a pictorial representation of such a system. Here, data can be communicated between the utility provider 7 and the homes in the NAN 9 using a range of different messaging patterns and/or transport protocols 11a, 11b, 11c in the transport layer. Embodiments described herein have particular utility in resource constrained network environments as presented by the Smart Grid and the Internet of Things (IoT), which lack the network resources available when using modern high speed LANs and WANs, for example.

Figures 3, 4:
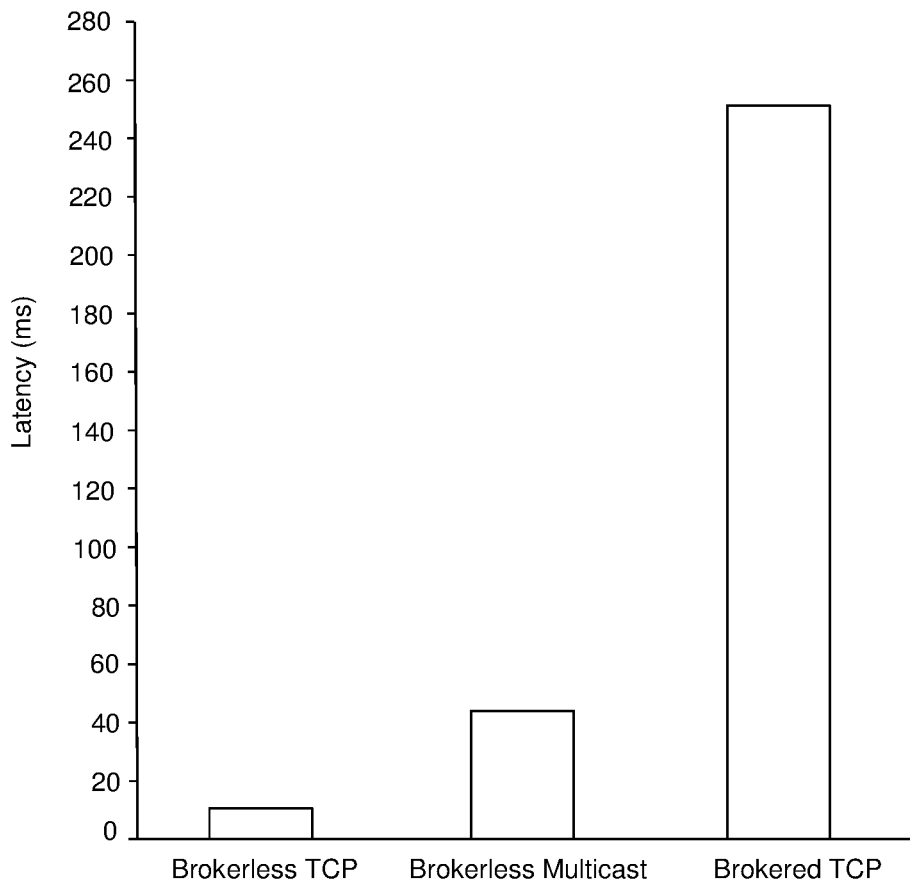
FIG. 3 shows a graph comparing performance of 3 different communication approaches in terms of latency, when given the same task.
FIG. 4 shows a table comparing the communication approaches employed in FIG. 3 in terms of the number of packets and bandwidth required for the task.

The advantage afforded by embodiments described herein can be understood with reference to FIGS. 3 and 4. The graph of FIG. 3 shows a simulation of how three different communication approaches will perform in terms of latency, given the same task. Where reduced latency is a priority, it is clear that Brokerless TCP is the optimal approach as it provides the lowest latency. However, as shown in the table of FIG. 4, the same is not true if bandwidth, rather than latency, is prioritised; in this case, brokerless multicast is the optimal choice as it requires the least bandwidth. These results show that specific combinations of transport and messaging pattern lead to trade-offs in terms of, in this case, latency and bandwidth. The manipulation of these transport level attributes can therefore offer advantages in terms of overall QoS, by allowing networked devices and the networking system to effect different priorities for different QoS metrics in different parts of the system.

An example of a system according to an embodiment will now be described with reference to FIGS. 5 to 7.

Figure 5:
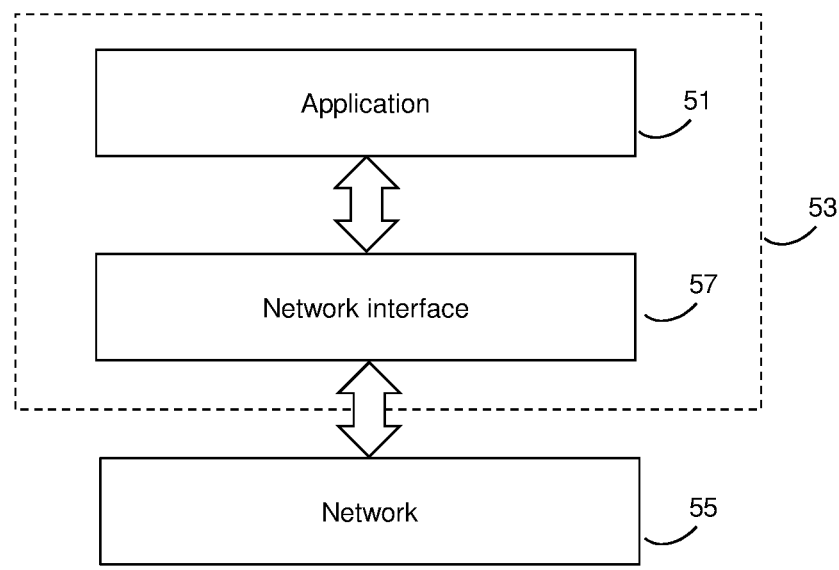
FIG. 5 shows a schematic of a conventional system.

FIG. 5 shows a schematic of a conventional system. An application 51 hosted on a network device 53 (which may be, for example, a desktop computer, laptop, tablet or mobile phone) communicates with the network 55 via a standard network interface 57, typically a socket application programming interface (API). In this case, the low level configuration (address, port, transport protocol etc.) of the communications interface is carried out in the application layer of the network and takes place entirely during the application runtime. The application must support each transport protocol and messaging pattern in use; typically, this is achieved through the use of individually included socket APIs. The transport options are fixed at run time.

Figure 6:
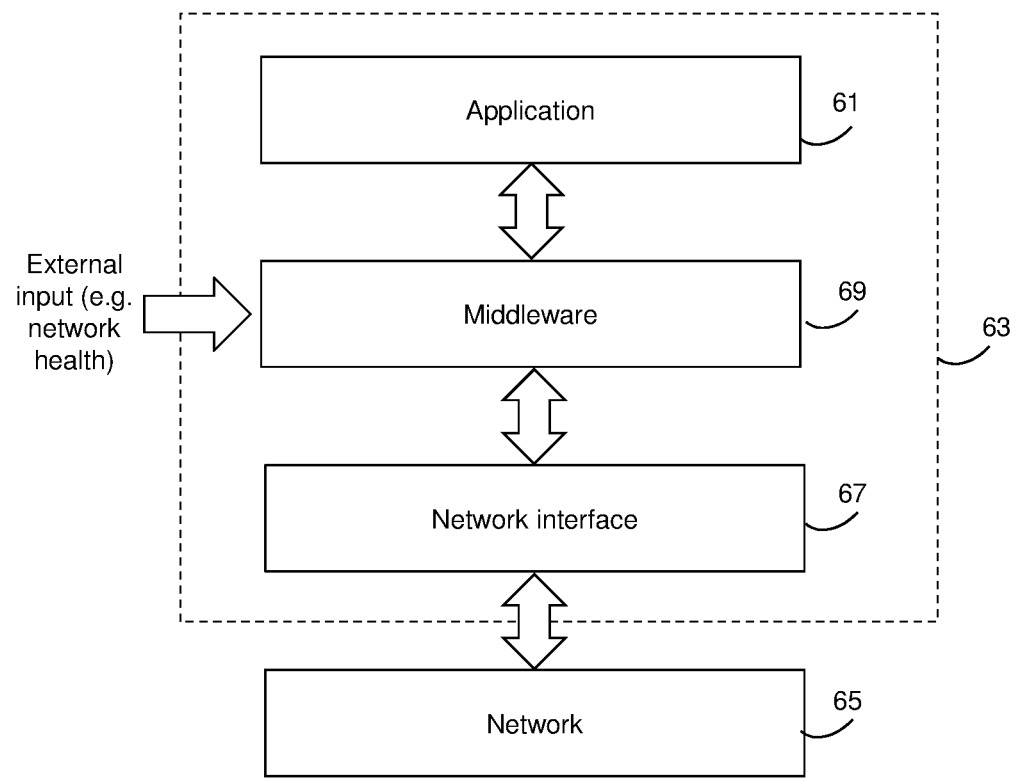
FIG. 6 shows a schematic of a system according to an embodiment.
Figure 7:
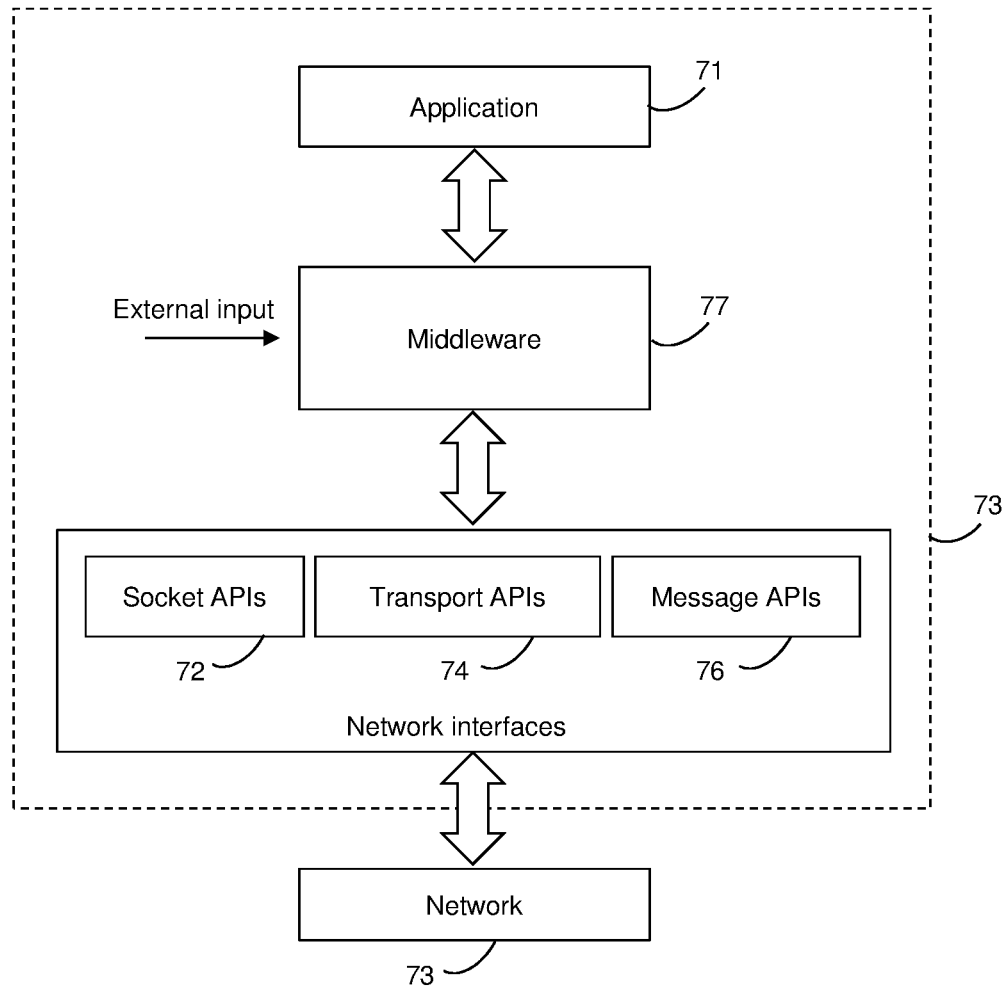
FIG. 7 shows a schematic of a system according to an embodiment.

FIG. 6 shows a schematic of a system according to an embodiment. The arrangement is similar to that of FIG. 5, but includes an additional middleware component 69 that sits between the application 61 and the network interface 67. In this example, all low level details pertaining to setting up communications are abstracted to the middleware component 69.

The middleware component can be considered as a discrete software entity facilitating the abstraction of advanced communication transport options from the application transparently, by generating customised network interface sockets at runtime. Through use of the middleware component, it is possible to facilitate and manage transport level Quality of Service in a way that provides measurable performance increases compared to conventional systems that use a fixed transport paradigm.

In use, the application will send its high level requirements to the middleware component and the middleware component will then deal with creating a custom network interface with the desired attributes. The middleware is used to form a network interface that is generic on the application facing side and highly customised on the network facing side; whilst the communication interface between the application and the middleware can be viewed as simple, fixed and self-descriptive, the interface formed between the middleware and the network is more complex and may vary over time.

The middleware component is used to actively select network interface characteristics including, for example, the transport layer protocol and/or messaging pattern that is used for passing data to and/or from the application. The choice of transport protocols may include, for example, Transport Control Protocol (TCP), User Datagram Protocol (UDP) Unicast, User Datagram Protocol (UDP) Multicast and Pragmatic General Multicast (PGM). The middleware may also incorporate external inputs such as network conditions in order to influence its choice of network interface characteristics. FIG. 7 shows how the middleware 77 may interact with one or more different types of application programming interfaces, including Socket APIs 52, Transport APIs and Message APIs 76 in order to form an interface between the application 71 and network 73. It will be understood that there is no limit on the number of network interface components (transport protocols, messaging patterns etc.) that form the interface choice pool. Applications do not need to have any specific support for the transport protocols and messaging patterns used by the middleware. The transport options are not fixed at run time but may be dynamically varied so as to optimise the QoS for the application.

Figure 8:
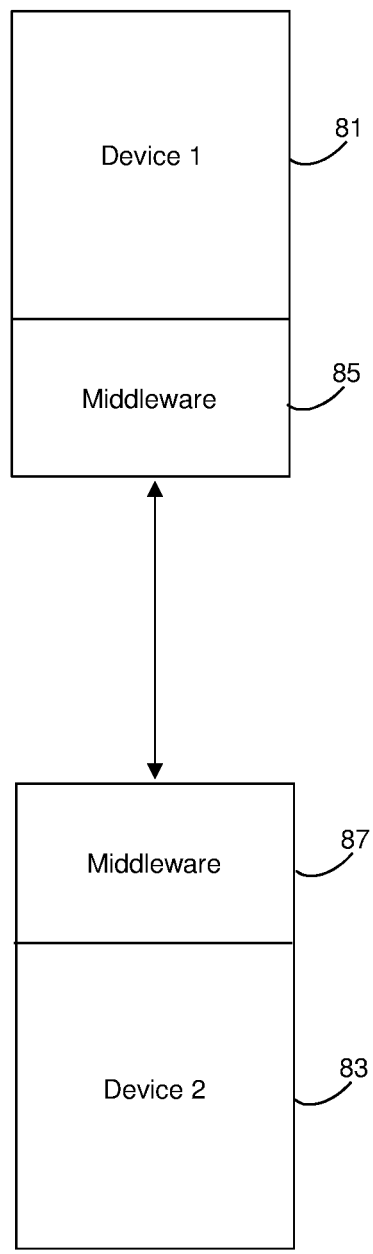
FIG. 8 shows an example of a system according to an embodiment, in which each network device is provided with its own respective middleware component.

In embodiments described herein, the network devices and the middleware components can be considered collectively to comprise a system. In some embodiments, each network device in the system may have its own associated middleware component. An example of this is illustrated in FIG. 8, in which two network devices 81, 83 are each provided with their own respective middleware components 85, 87, these modules being used to facilitate communication between the network devices 81, 83. However, it will be understood by the person skilled in the art that a given middleware component need not be exclusively coupled to a single device; for example, a middleware component may be installed on a separate (remote) device with which more than one network device can communicate and interact.

Each middleware component may automatically generate more instances of itself and automatically deploy them to additional processes, threads and servers. Doing so is useful as the processor intensive parts of this communication method are all abstracted to the middleware. It is also possible to provide redundancy in the system, whereby, in the event that a particular middleware instance fails or it is no longer possible to contact that instance, network devices may initiate communication with different instances located elsewhere in the system.

In embodiments described herein, the loosely coupled nature of the architecture provides a large degree of scalability potential. For example, the middleware does not have any restrictions on its execution environment. The middleware can be located within the same address space as the application(s), on remote hardware connected by the internet or anywhere between these two extremes. Thus, a single broker based middleware entity may deal with all communications for a large group of managed applications at one extreme and at the other extreme, every application may have its own middleware process running on the same processor as itself.

The middleware provides the ability to generate per-application customised network sockets. These sockets provide a software interface to the physical network that puts data on to the communication link (wired or wireless) for each application. This interface is assignable to any application within the scope of the execution environment. The application sends the raw payload to the middleware and it deals with the transport protocol and messaging pattern combinations transparently. This allows the application to continue operating while the underlying transport attributes are dynamically modified to best suit current network conditions and the application's specified priorities in terms of bandwidth, latency and reliability. In this way, it becomes possible to dynamically select optimum transport protocol and/or messaging patterns for devices in distributed machine-to-machine systems, whilst taking into account factors including the device capabilities and network connection state/quality.

The middleware facilitates several key operations:

1. Application pool management—The middleware will ensure there is always a free application process to deal with incoming messages addressed to that worker pool. When new work is received the middleware will fork( ) and exec( ) a new application worker process. This allows the application to scale with workloads easily. When the worker is no longer needed it is destroyed to conserve resources.

2. Session initiation—The middleware will perform all session initiation operations on behalf of its applications. All session initiations are between local and remote middleware instances.

3. External network status input—The middleware will take an external input (link latency, link bandwidth, packet loss etc.) and incorporate that information into the transport selection process in order to choose an optimal transport option.

4. Link Fanout Estimation—The middleware will enquire about how many remote middleware instances are interested in its message and incorporate that information into the transport selection process in order to choose an optimal transport option.

Figure 9:
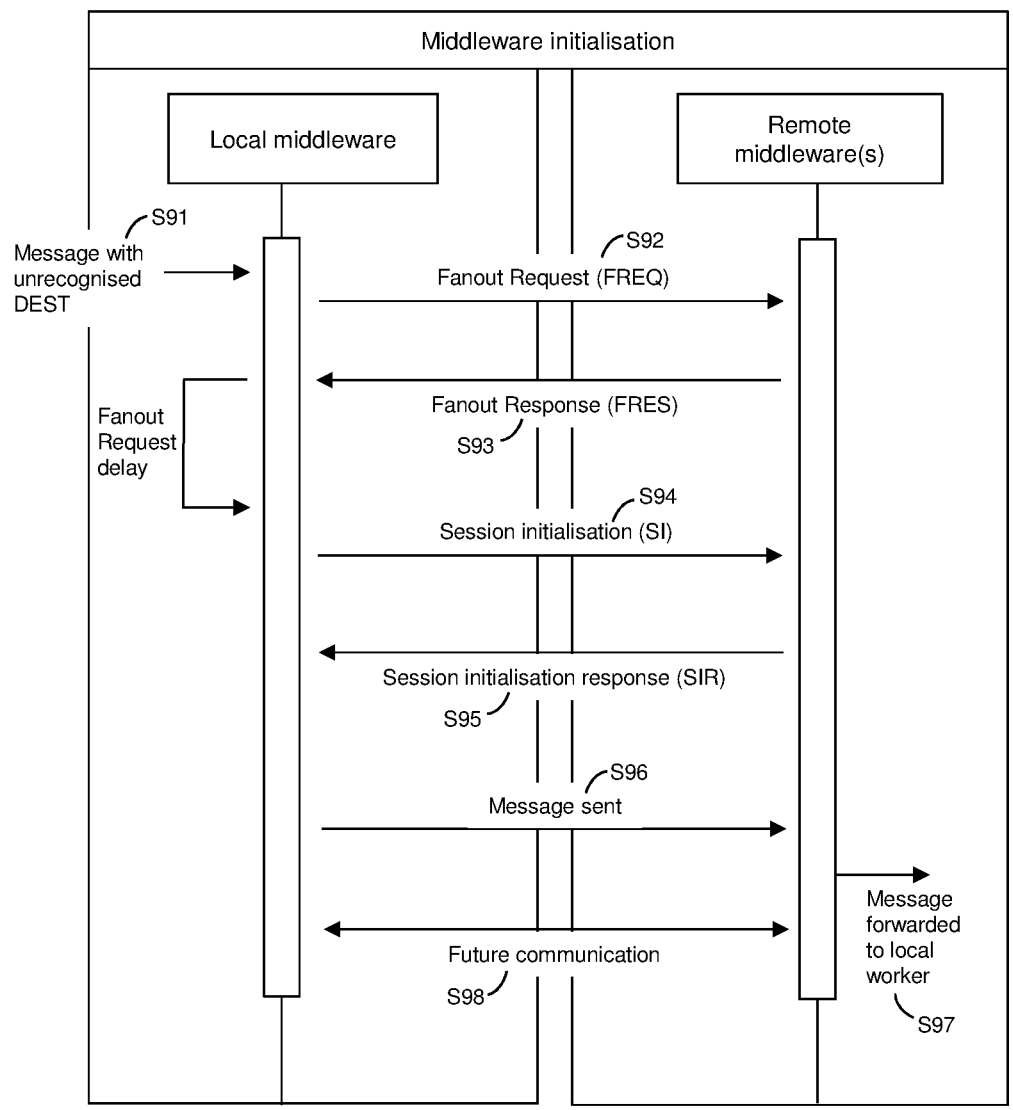
FIG. 9 shows an example of the sequence of events involved in session initiation in a system according to an embodiment.

An example of the sequence of events involved in session initiation is explained with reference to FIG. 9, which shows the interaction between middleware components associated with two networked devices (labeled as local and remote, respectively). The sequence begins when the local middleware component receives a message from its associated application with an unrecognised destination (Step S91). The local middleware prepares and sends a Fanout Request (FREQ) to the middleware component associated with the remote device (Step S92). In Step S93, the remote middleware component issues a Fanout Response (FRES), after which the local middleware initiates a session with the remote middleware (Step S94). During this step, the local middleware establishes the transport options that are to be used during the session. The remote middleware transmits a Session Initialisation Response (SIR) and a session is set up between the two devices (Step S95). Messages are then sent between the two devices using the transport options specified by the local middleware at the point of initialising the session.

The session initiation allows the customised transport options to be communicated and set up. Session initiation with the destination middleware is transparently handled from the application's point of view. Once a session has been set up, the communication method can be changed as often as desired during that session, for example in order to maintain optimal performance in changing network conditions. The middleware will deal with all session initiation aspects that come with changing the low level transport attributes dynamically at run time.

Figure 10:
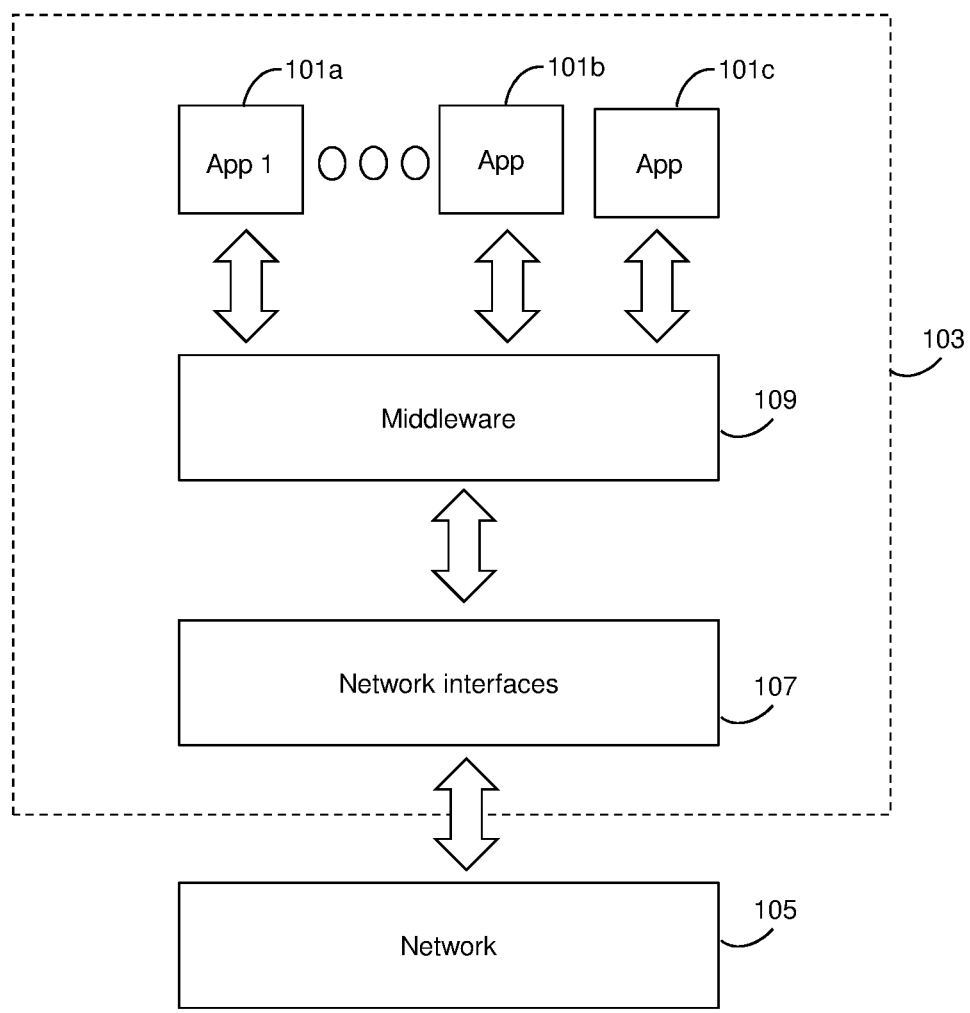
FIG. 10 shows a schematic of a system according to another embodiment.

FIG. 10 shows a further example of a system according to an embodiment. In this embodiment, the network device 103 hosts multiple applications 101a, 101b, 101c that operate simultaneously using multiple different communication approaches. Each application is interfaced with the network 105 via the middleware 109. For each application, the middleware 109 tailors the transport protocol and/or messaging pattern to obtain optimal efficiency for the metrics that have been prioritised. The middleware can vary the combination of transport protocol and messaging pattern at will in order to adapt to changing network conditions or QoS priority changes. The middleware is explicitly loosely coupled with the applications and provides a high degree of scalability and flexibility with regards to its positioning within the architecture.

Figure 11:
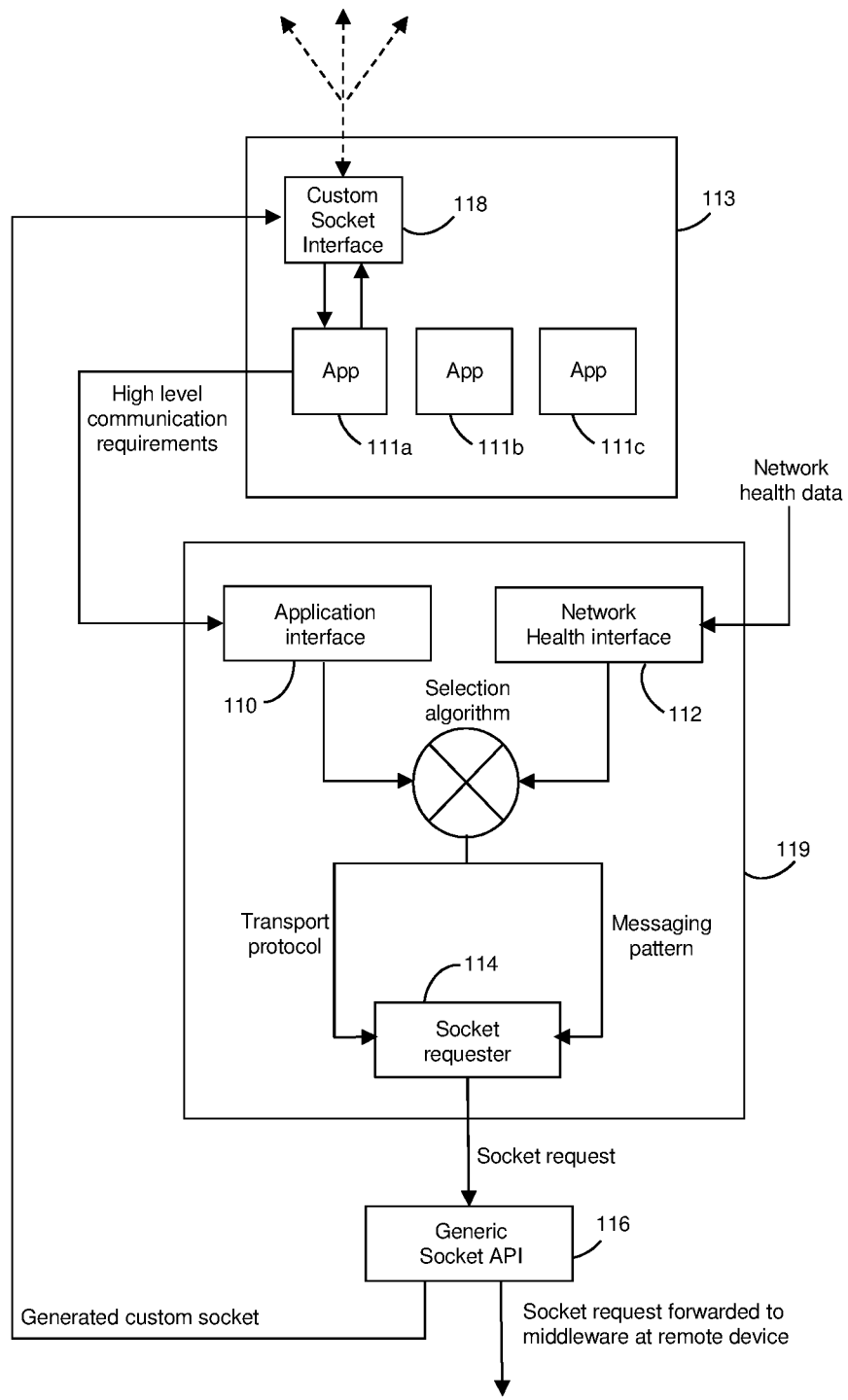
FIG. 11 shows a structural overview of a middleware component as used in a device according to an embodiment.
Figure 12:
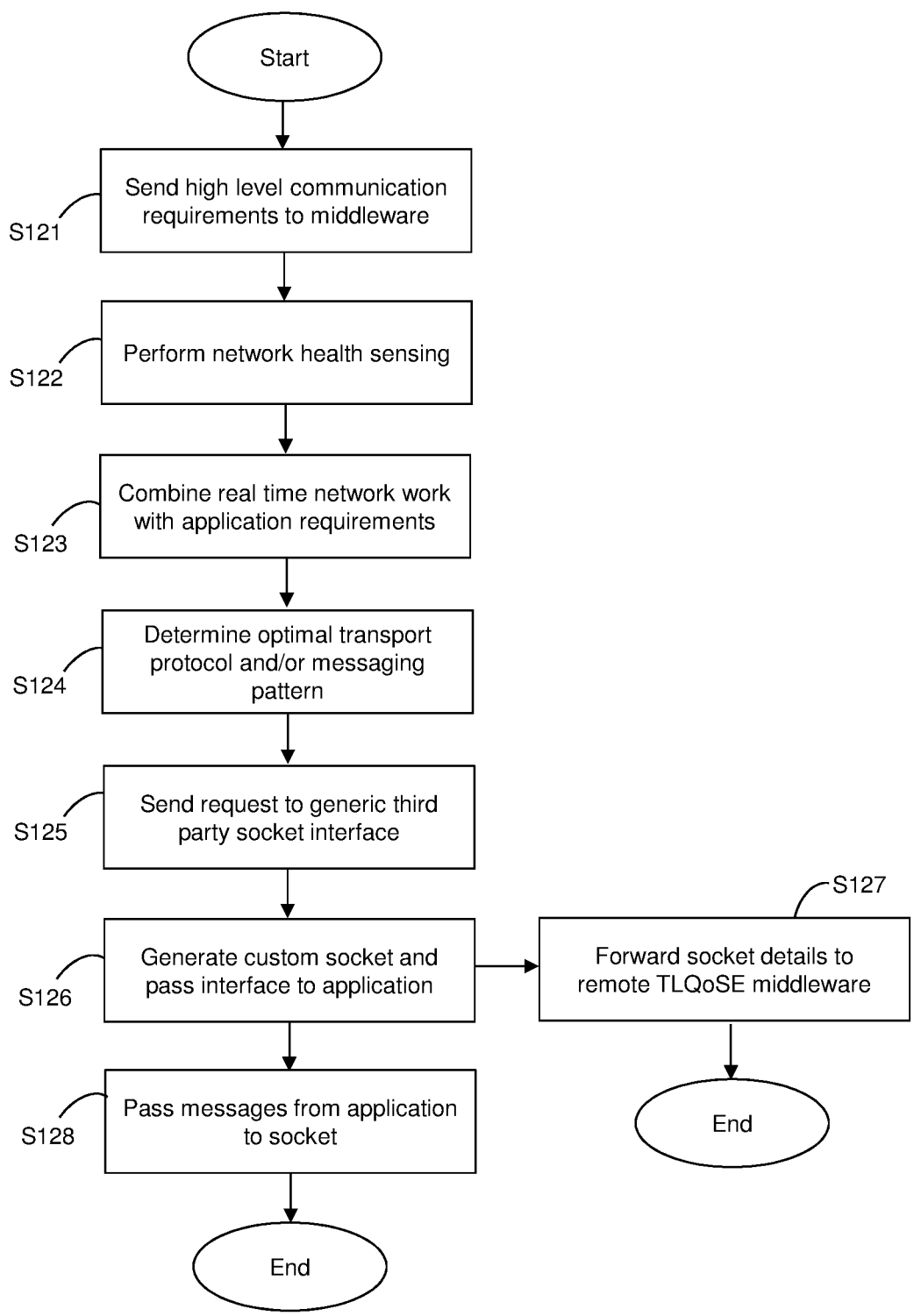
FIG. 12 shows a flow-chart illustrating the steps by which an application is interfaced with a network, according to an embodiment.

The means by which the middleware interfaces a respective application with the network will now be described with reference to FIGS. 11 and 12. FIG. 11 shows a structural overview of the middleware component 119, which in this embodiment is referred to as a Transport Level QoS Engine. The flow-chart of FIG. 12 illustrates the stages by which the application is interfaced with the network. The Transport Level QoS Engine initialises the communications and then allows direct communication afterwards. This will allow for a higher performance than, for example, other systems that use a single instance of middleware to proxy all service requests.

Commencing with step S121, one of the applications 111a, 111b 111c sends its high level communications requirements to the application interface 110 of the middleware 119. The middleware 119 also includes a separate interface 112 configured to receive as input network health measurements (step S122). The communication requirements and network health measurements are together input into a selection algorithm (step S123), which in turn determines the optimum transport protocol and/or messaging pattern for the application (step S124). The middleware next executes the socket requestor 114, which sends a request to a generic third party socket API 116 (step S125). The socket API in turn generates a customised network socket, based on the transport protocol/messaging pattern supplied to it by the middleware component (step S126). Once the third party socket API has generated the socket, the socket details are sent to the remotely located middleware components to enable those remote middleware components to replicate the socket in order to have compatible communications (Step S127). The remote middleware components are informed each time the transport protocol/messaging pattern changes. The custom socket is passed to the application 111a, which in turn uses the socket to establish a network link with another entity and to transmit data to that entity (Step S128). The socket interface provides the application with a generic interface to the complex transport and messaging pattern combination. The interface is typically a high speed inter-process connection to the generated custom socket, which resides within the middleware.

Figure 13:
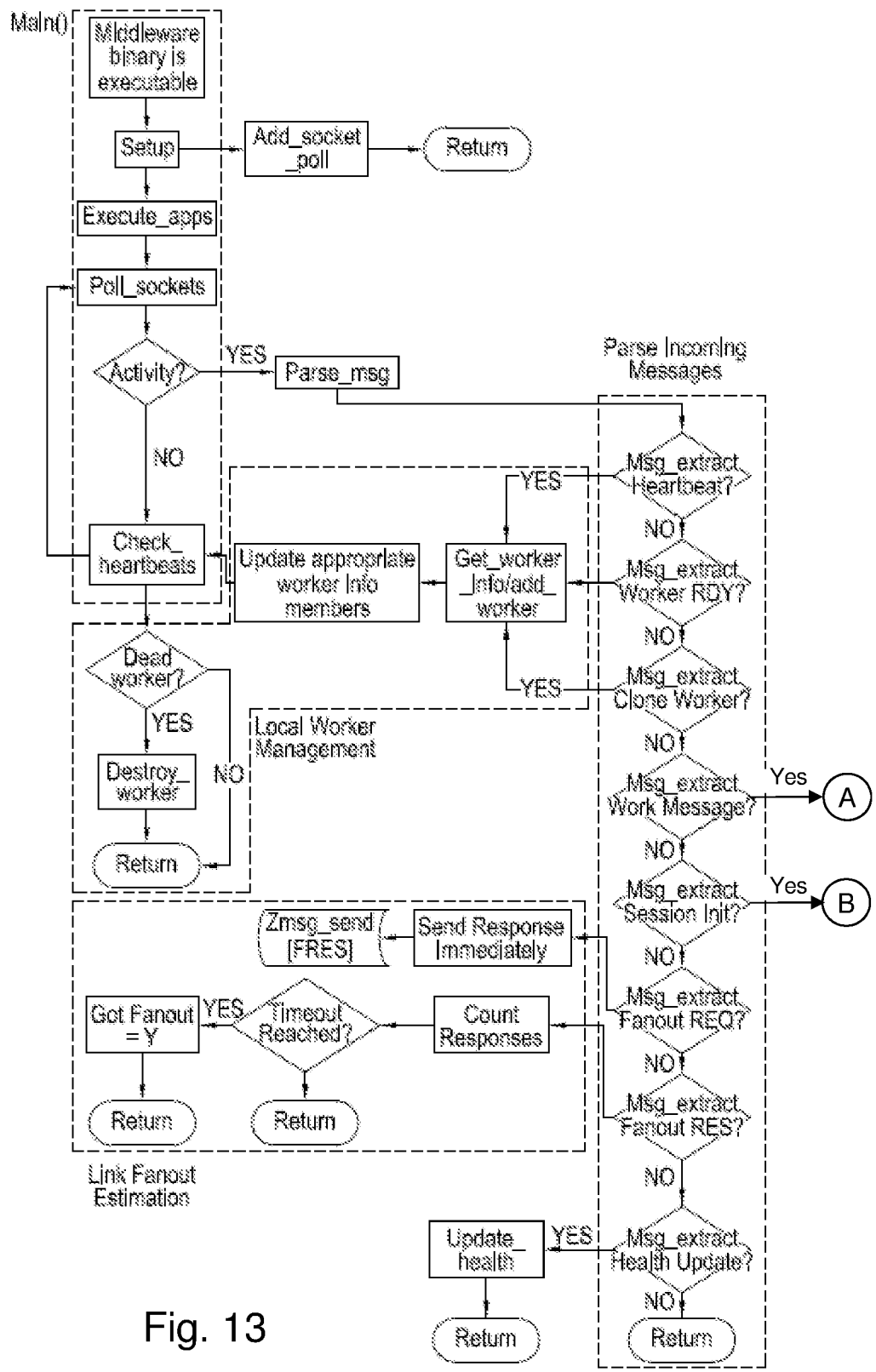
FIG. 13 shows a flow-chart of steps implemented within a middleware component in a device according to an embodiment.
Figure 13:
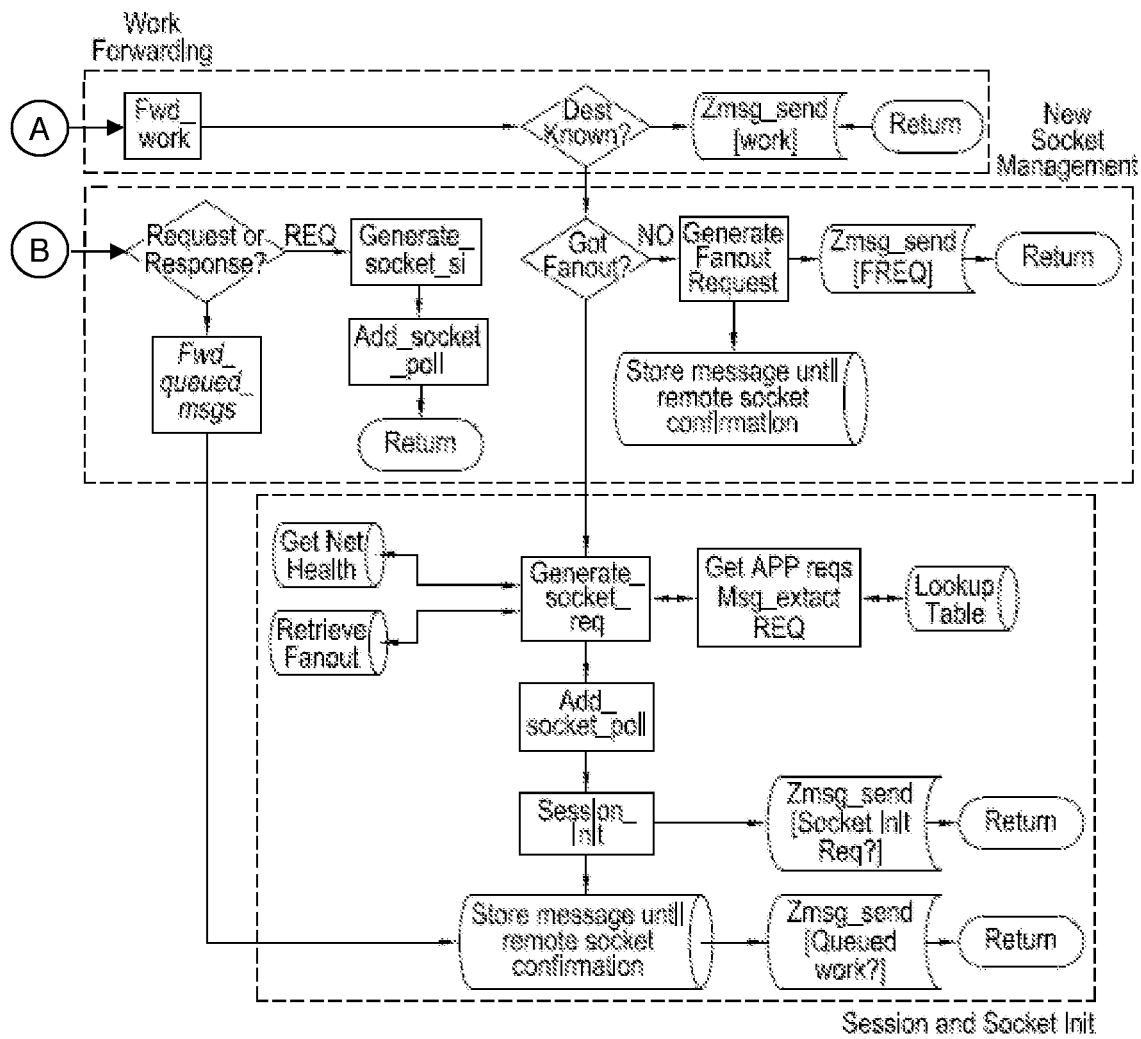

An example of steps implemented within the middleware is shown in the flowchart of FIG. 13, with the modular functions being summarised below.
void main( )
  Main cyclic executive for the middleware
  Runs setup( )
  Runs execute_apps( )
  Runs in an infinite loop: poll_sockets( ) and check_heartbeats( )
void setup( )
  Performs the start-up setup procedures
  prints start up message
  creates ZMQ context
  creates hash containers:
    address_to_info—ROUTER GUID string retrieves pointer to workerinfo_t struct
    appid_to_list—APPID string retrieves pointer to worker pool zlist_t struct
    poll_hash—Socket ID string retrieves pointer to ZMQ socket
  Adds default sockets to poll hash:
    Frontend IPC
    Backend IPC
    DEF_SUB PGM
    DEF_PUB PGM
  Adds endpoints to all default sockets
void execute_apps( )
  Executes the software applications
  Scans APPS/directory for *.o files
  Forks and execs each binary app found
void poll_sockets( )
  Cycles through the poll items array polling each socket for external activity
  polls all sockets contained in the poll_items array
  If one has messages waiting to be processed then receive it and run parse_msg(msg)
void check_heartbeats( )
  Checks all workers are alive and deals with them if they are not
  Creates zlist_t of all worker addresses
  Cycles through the list looking up the workerinfo_t for each address through address_to_info
  Checks the heartbeat member of the workerinfo_t agains the current time
  If the heartbeat time has passed the worker is dead—call destroy_worker( )
  Checks the lastwork member of the worker_info_t
  If the last work received was too long ago and pool is >1—call destroy_worker(char *address)
void destroy_worker(char *address)
  Destroys worker and removes all information pertaining to it
  Looks up the workerinfo_t pointer given the address string of the worker to be destroyed
  Creates the termination message and sends it to the worker
  Get the worker pool zlist_t pointer member of the workerinfo_t
  Remove the worker address from the worker pool
  Free and delete all associated hashes and structures
workerinfo_t *get_worker_info(zmsg_t msg)
  Retrieves the structure containing a worker's information
  Gets worker GUID from the message
  Looks up workerinfo_t pointer using address_to_info hash
  If the pointer !=NULL then return it
  Else pass the message and GUID to the add_worker function as this is a new worker
workerinfo_t *add_worker(zframe_t *address, zmsg_t *msg)
  Adds a new worker to a specific pool and populates and returns its workerinfo_t structure
  Malloc a new workerinfo_t structure
  Set the address_ptr and address members of the structure
  Extract APP_ID frame and parse
  Add worker GUID to appropriate application pool if the pool exists
  If the pool does not exist then create the zlist (pool) and add it to the appid_to_list hash
  Set the pool pointer member if the worker's workerinfo_t
  Set the worker's last worker time and heartbeat status
  Return the freshly generated workerinfo_t
void add_socket_poll(void *socket_ptr,char *ID)
  Adds a new socket to the poll items array
  If passed socket is NULL then remove the socket hashes with the char *ID
  Else add the passed pointer the socket hash along with its handle (ID)
  Add the socket to the zmq_pollitem_t socket array
void generate_socket_si(zmsg_t *msg,int *socket_type)
  Generates a new socket from information contained within a SI (socket initiation) message—remote initiation Extracts the socket ID and endpoint from the passed SI message
Calls add_socket_poll and passes freshly generated socket
Binds socket to the extracted endpoint
Sets PUB subscriptions if needed
void session_init(void * socket, char * ID)
Performs the session initiation when an unknown destination is specified as a destination.
Generates the SI message—message format:
1. "SI" (String)
2. Socket type (INT)
3. ID (String)
4. Endpoint (String)
5. SUB (String, optional)
Sends the message to remote middleware—PUBLISHES it using multicast with the topic set to frame 1 i.e. "SI"
void * generate_socket_req(zmsg_t *msg)
Local middleware is generating a new socket based on application specified requirements and current network health
Extracts prioritised metric frame—Latency, Reliability, Bandwidth
Extracts estimated fan-out frame
Extracts destination frame
Lookup table specifying transport and messaging pattern combinations based on above and network health
Generates the socket and adds it to the poll array using add_socket_poll
Calls session_init with generated socket which generates the SI message to send to the remote middleware
void fwd_work(zmsg_t *msg, char *dest_str)
Gets work message from either local workers or remote middleware and forwards it to the correct destination
Removes the senders GUID or topic frame
Checks if the dest_str is a local worker pool
If it is retrieve an idle worker, modify the clone flag and forward the message to it
If it is not then call generate_socket_req
void parse_msg(zmsg_t *msg)
Checks for various message markers and calls the correct functions to parse the message
Checks for markers using the msg_extract function
If the heartbeat marker exists, update the workerinfo_t for that worker and send it back
If the RDY marker exists and worker has completed working and needs to be added back to the idle list
If the CLN marker exists a new worker instance needs to the forked and exec'd
If the DST marker exists, fwd work is called
If the SI marker exists, generate_socket_si is called
If the HLH marker exists, current network health is updated
void *msg_extract(zmsg_t *full_msg,const char *tag,int operation)
Cycles through every frame in a message looking for the specified string. Once found it performs the specified operation.

In summary, embodiments described herein provide advantages including:
i) The ability to have much greater control to deliver against application QoS requirements.
ii) The ability to adapt to changing network conditions at a lower level than before, providing the potential for increased performance especially in resource constrained and lossy networks.
iii) The ability to support legacy applications (i.e. those not specifically designed with this technology in mind) with only very minor modifications.

While certain embodiments have been described, these embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made without departing from the scope of the invention. The accompanying claims and their equivalents are intended to cover such forms or modifications as would fall within the scope of the invention.

The invention claimed is:

1. A method of establishing a first network connection between a first application hosted on a first network device and a second network device, and establishing a second network connection between a second application hosted on the first network device and a third network device, comprising:
receiving data from the first application indicating first communication requirements for the first network connection;
receiving data from the second application indicating second communication requirements for the second network connection;
identifying a plurality of alternative available transport level components;
based on the received data indicating the first communication requirements, selecting one of the transport level components as a first transport level component for use in the first network connection; and
based on the received data indicating the second communication requirements, selecting one of the transport level components as a second transport level component for use in the second network connection.

2. The method according to claim 1, wherein the plurality of transport level components includes one or more transport protocols.

3. The method according to claim 1, wherein the plurality of transport level components includes one or more messaging patterns.

4. The method according to claim 1, wherein the first transport level component is chosen so as to optimize the quality of service (QoS) of the first network connection, and the second transport level component is chosen so as to optimize the QoS of the second network connection.

5. The method according to claim 1, wherein the first communication requirements relate to one or more of the latency and bandwidth required for the first network connection, and the second communication requirements relate to one or more of the latency and bandwidth required for the second network connection.

6. The method according to claim 1, wherein the choice of the first transport level component is varied during the course of a first session between the first application and the second network device, and the choice of the second transport level component is varied during the course of a second session between the second application and the third network device.

7. The method according to claim 6, wherein one of the available transport level components is selected as the first transport level component during initiation of the first session and one of the available transport level components is subsequently selected as the first transport level component during the first session, and one of the available transport level components is selected as the second transport level component during initiation of the second session and one of the available transport level components is subsequently selected as the second transport level during the second session.

8. The method according to claim 1, wherein the method includes receiving information about the network environment, the choice of the first transport level component is determined at least in part based on the information, and the choice of the second transport level component is determined at least in part based on the information.

9. The method according to claim 8, wherein the selection of the first transport level component is varied over time in response to changes in the network environment, and the selection of the second transport level component is varied over time in response to changes in the network environment.

10. The method according to claim 1, wherein the first network device hosts a plurality of applications including the first application and the second application, and the method comprises establishing a respective network connection for each application, the selection of transport components being carried out independently for each application.

11. The method according to claim 10, comprising generating a respective network socket for each application, the socket being generated based on the transport components selected for that application's network connection.

12. The method according to claim 1, comprising transmitting data from the first application to the second network device across the first network connection, and transmitting data from the second application to the third network device across the second network connection.

13. A device capable of establishing a first network socket for connecting a first application to a first communications network, and establishing a second network socket for connecting a second application to a second communications network, the device comprising:
  circuitry configured to interface with the first application and to receive data from the first application indicating first communication requirements of the first application, wherein the circuitry is configured to interface with the second application and to receive data from the second application indicating second communication requirements of the second application;
  the circuitry being configured to identify a plurality of alternative available transport level components for use in communicating data from the first application over the first communications network and to select one of the transport level components as a first transport level component for generating the first network socket based on the received data indicating the first communication requirements; and
  the circuitry being configured to identify a plurality of alternative available transport level components for use in communication data from the second application over the second communications network and to select one of the transport level components as a second transport level component for generating the second network socket based on the received data indicating the second communication requirements.

14. The device according to claim 13, wherein the plurality of transport level components includes one or more transport protocols.

15. The device according to claim 13, wherein the plurality of transport level components includes one or more messaging patterns.

16. The device according to claim 15, wherein the first transport level component is chosen so as to optimize the quality of service (QoS) of the first network socket, and the second transport level component is chosen so as to optimize the QoS of the second network socket.

17. The device according to claim 13, wherein the first communication requirements relate to one or more of the latency and bandwidth required for the first network socket, and the second communication requirements relate to one or more of the latency and bandwidth required for the second network socket.

18. The device according to claim 13, wherein the circuitry is configured to vary the choice of the first transport level component during the course of a first session between the first application and a first network device, and the circuitry is configured to vary the choice of the second transport level component during the course of a second session between the second application and a second network device.

19. The device according to claim 18, wherein the circuitry is configured to select one of the available transport level components as the first transport level component during initiation of the first session and to subsequently select one of the available transport level components as the first transport level component during the first session, and the circuitry is configured to select one of the available transport level components as the second transport level component during initiation of the second session and to subsequently select one of the available transport level components as the second transport level component during the second session.

20. The device according to claim 13, wherein the circuitry is configured to receive as input information about the network environment, to select the first transport level component at least in part based on the information, and to select the second transport level component at least in part based on the information.

21. The device according to claim 13, wherein the circuitry is configured to interface with a plurality of applications including the first application and the second application, and to receive data from each application indicating communication requirements of the respective application;
  the circuitry being operable to select a transport level component for generating a respective network socket for each application, wherein the transport level components are selected independently for each application.

22. The device according to claim 13, wherein each application is hosted on the device.

23. A system comprising a plurality of devices, the system being capable of establishing a first network socket for connecting a first application to a first communications network, and establishing a second network socket for connecting a second application to a second communications network, the system comprising:
  circuitry configured to interface with the first application and to receive data from the first application indicating first communication requirements of the first application, wherein the circuitry is configured to interface with the second application and to receive data from the second application indicating second communication requirements of the second application;
  the circuitry being configured to identify a plurality of transport level components for use in communicating data from the first application over the first communications network and to select one of the transport level components as a first transport level component for generating the first network socket based on the received data indicating the first communication requirements; and the circuitry being configured to identify a plurality of transport level components for use in communicating data from the second application over the second communications network and to select one of the transport level components as a second transport level component for generating the second network socket based on the received data indicating the second communication requirements.

24. A system comprising
a network device that hosts one or more applications; and
one or more devices capable of establishing a first network socket for connecting a first application to a first communications network, and establishing a second network socket for connecting a second application to a second communications network, the system comprising:
circuitry configured to interface with the first application and to receive data from the first application indicating first communication requirements of the first application, wherein the circuitry is configured to interface with the second application and to receive data from the second application indicating second communication requirements of the second application;

the circuitry being configured to identify a plurality of transport level components for use in communicating data from the first application over the first communications network and to select one of the transport level components as a first transport level component for generating the first network socket based on the received data indicating the first communication requirements; and the circuitry being configured to identify a plurality of transport level components for use in communicating data from the second application over the second communications network and to select one of the transport level components as a second transport level component for generating the second network socket based on the received data indicating the second communication requirements.

* * * * *